Figure 1:
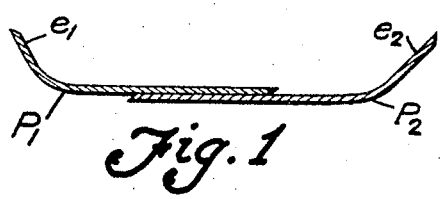

INVENTORS
Charles A. Nichols and
Raymond H. Bish
BY
Spencer Hardman & Fehr
their ATTORNEYS Patented May 13, 1941

2,241,644

UNITED STATES PATENT OFFICE 2,241,644

MULTIPLY TUBING

Charles A. Nichols and Raymond H. Bish, Anderson, Ind., assignors to General Motors Corporation, Detroit, Mich., a corporation of Delaware Original application August 5, 1938, Serial No. 223,245. Divided and this application September 9, 1939, Serial No. 294,112

3 Claims. (Cl. 138—62)

This invention relates to improvements in the manufacture of multiply tubing made by forming a plurality of flat strips of steel into concentric cylindrical plies with the seams of the plies disposed a substantial distance apart. The tubing is completed by passing it through a bath of molten brazing metal which penetrates the interstices between the seams and plies to bond the seams and plies together.

This application is a division of Serial No. 223,245, filed August 5, 1938, Patent No. 2,195,751.

It is a primary aim and object of the present invention to provide a novel tube forming method and apparatus by which the formation of multiply tubing may be carried on continuously and at a relatively great speed of travel of the tube stock. This object is accomplished by forming overlapping strips of steel stock into multiply tubular shape approximately the shape of the finished product and then by swaging the approximately formed plies of tubing into the desired shape with the plies substantially cylindrical and concentric and closely compacted together with their seams substantially closed. More specifically the overlapping portions of the strips are simultaneously formed into semi-cylindrical or half tubular portions of the completed plies. Then the outer ply is formed into approximately cylindrical formation and then the inner ply is formed around a portion of the outer ply and into approximately cylindrical formation. Then follows the swaging operation which causes the plies to be compacted closely with the seams practically closed. The resulting tubing comprises an inner layer provided by lapping sections of the two plies of stock, and an outer layer likewise provided by lapping sections of the same two plies of stock. In other words, each ply provides one half of the inner layer and one half of the outer layer of the tubing. The advantages of this construction will be made apparent hereinafter.

Further objects and advantages of the present invention will be apparent from the following description, reference being had to the accompanying drawing, wherein a preferred embodiment of the present invention is clearly shown.

Figure 9:
Figure 10:
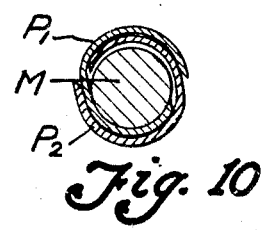
Figure 11:
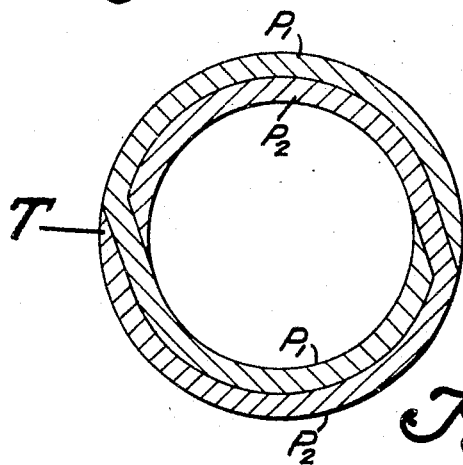

In the drawing:

The eleven figures of the drawing are sectional views showing various steps in the process of manufacturing tubing according to the present invention, Fig. 11 being drawn to a larger scale than Figs. 1 to 10.

The multiply tubing, lettered T in Fig. 11, comprises an inner ply $P_1$ and an outer ply $P_2$ having their edges beveled or scarfed at 20° angles. For ¼" O. D. tubing the plies of steel are .013" to .015" thick. Before scarfing, the plies are .7275" to .7325" wide and are scarfed to .743" to .748" wide. The plies are scarfed by means of scarfing rollers designed to produce the required bevel. The ply strips $P_1$ and $P_2$ are unwound from supply reels by the operation of the tube forming apparatus, all of which is disclosed in Patent No. 2,195,751. The plies pass first through a degreaser which removes all of the oil previously placed upon the strip steel to protect it from rust.

The cleansed plies $P_1$ and $P_2$ then pass to an oiler which applies oil to the inner surface of the inner ply $P_1$ and to the outer surface of the outer ply $P_2$ but not to adjacent surfaces of the two plies. Lubrication of the plies is necessary in order to reduce friction and prevent the galling of the arbor or mandrel and rolls of the forming apparatus by the plies of steel passing through. A close control of the amount of oil on the plies is imperative. To control the amount of oil, the plies are first passed through the degreaser to remove all of the oil previously on the plies and a wick type oiler is used to apply the correct amount of oil of known composition. Any light oil free of sulphur, such as commercial "ceresinol", would be satisfactory. The amount of oil supplied is sufficient for the lubrication of material as it passes through the forming apparatus and a slight amount of oil will remain on the inside of the tubing as it enters the brazing furnace. This oil forms a gas in the brazing furnace which combines with the oxygen inside the tubing and prevents oxidation of the inside of the tubing. The exterior of the tubing is protected while passing through the brazing furnace by introducing into the furnace a supply of reducing gas. The adjacent surfaces of the plies $P_1$ and $P_2$ should be free from oil, since no useful purpose is served by applying oil to these surfaces. The amount of oil taken by the tubing into the brazing furnace should be as small as possible in order to eliminate the carburizing effect of this oil. Therefore, the oiler is constructed so as not to place any oil between the plies.

The plies $P_1$ and $P_2$ are progressively shaped as indicated by Figs. 1 to 11 by passing the plies between sets of forming rolls which are geared together and to a source of power so that the peripheral speed of surfaces of the rollers engaging the plies is substantially the same.

For the manufacture of ¼" O. D. tubing, a speed of 18 ft. per min. has been found satisfactory. All of the guides and rolls are made of chromium plated hardened steel.

Figure 2:
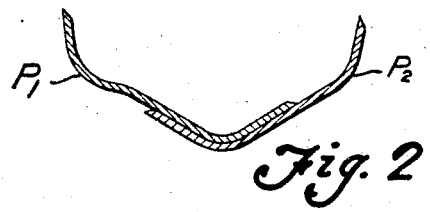

The plies $P_1$ and $P_2$ pass through a device which determines the amount of overlap of the plies. Then the plies pass between a first set of rolls which form a curve on the outside edge of each ply, as indicated by $e_1$ and $e_2$. While the plies pass from the first set of forming rolls to the second set, they are guided by a channel. The turned-up edges $e_1$ and $e_2$ of the plies cooperate with the side walls of this channel to hold the plies in correct relation without changing the overlap while the plies move into the second set of rolls. In the second set of rolls the work is formed as shown in Fig. 2. The overlapping portions of the plies are bent at an angle of about 120°. The plies are so offset that this 120° bend is located about one-quarter of the way in from the edges of the overlapping parts of the plies. The work thus formed passes through another guide before entering between the third set of rolls.

Figure 3:
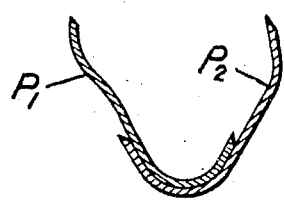

A third set of rolls forms the work into the shape indicated in Fig. 3. The non-overlapping parts extend roughly at an angle of 60° and the overlapping parts are formed somewhat into cylindrical formation.

Figure 4:
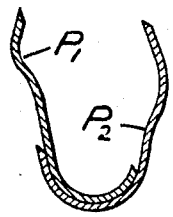
Figure 5:
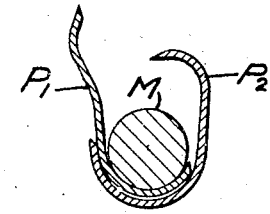

Then the work passes through a suitable guide from the third set to the fourth set of rolls where the work is formed as shown in Fig. 4 wherein the non-overlapping parts of the plies are roughly parallel. Between the fourth and fifth set of rolls the plies move into cooperative relation with a mandrel which is supported by means which extends down between the plies when in the position shown in Fig. 4.

Figure 6:
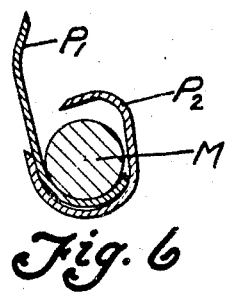
Figure 7:
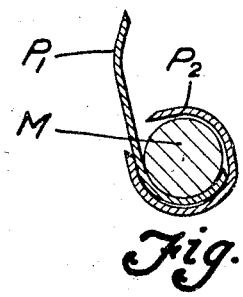
Figure 8:
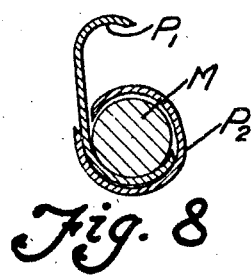

Up to the point where the stock enters between the fifth set of rolls, the rolls and guides previously referred to have caused the work to be shaped so that the overlapping portions of the plies have been formed simultaneously into approximately one-half cylindrical portions. Between the fifth set of rolls the completion of the formation of the outer ply $P_2$ is begun. This fifth set of rolls changes the shape from that shown in Fig. 4 to that shown in Fig. 5. By means of the sixth and seventh sets of rolls the ply $P_2$ is shaped as shown in Figs. 6 and 7. Then the work passes through an eighth set of rolls which cause the ply $P_2$ to be formed in close proximity to the mandrel and which begins the formation of the non-overlapping portion of the ply $P_1$.

The work then passes through the 9th and 10th sets of rolls which form the ply $P_1$ as shown by Figs. 9 and 10, respectively. Fig. 10 shows that the plies have been formed only approximately into cylindrical formation and that the plies have not been compacted together so that the space between them is at the minimum and so that the edges of the inner plies are abutting and the beveled edges of the outer plies are completely overlapping. The completion of the formation of the tubing T with closely compacted plies and closely contracted seams as shown in Fig. 11 on an enlarged scale, is effected by a rotary swaging machine disclosed in my Patent No. 2,195,751. As the tubing moves longitudinally over the mandrel, the rotary swager causes the plies, loosely formed as shown in Fig. 10, to be tightly compacted as shown in Fig. 11.

The tubing then passes into the brazing furnace in which the temperature of the tubing is elevated to about 2100° F., and in which the tubing passes through a bath of copper which, by capillary attraction, almost instantly enters and fills the interstices between the seams and plies of the tubing. The excess copper is wiped off by a gas wiper or jet which envelops the tubing as it passes from the brazing zone. Then the tubing passes through a cooler which is a water jacketed pipe containing a non-oxidizing atmosphere. The tubing is finally cooled by direct contact with water and rolled up into lengths of 1000 ft. The brazing apparatus is described and claimed in our Patent No. 2,197,191.

Referring to Fig. 11, it will be noted that the two strips $P_1$ and $P_2$ which form the tube are interlocking. This is due to the fact that each layer of tubing comprises a portion of the inner ply and a portion of the outer ply. Since the plies are interlocking, there can be no angular displacement of one ply with respect to the other. Where multiply tubing is formed from separate plies of stock in a manner such that the inner layer of the tube is provided in its entirety by one ply and the outer layer in its entirety by another ply, it is possible for an angular displacement between the two plies to take place during the formation of the tubing. This displacement is known as spiraling and occurs more frequently in larger sizes of tubing where the outside strip has a tendency to spiral independently of the inside strip. Therefore, the result is that, in certain places along the length of the tube, the seams may be adjacent. This is objectionable because the tube is not as strong where the seams are adjacent. Since the forming rolls shape the plies for interlocking engagement, the swager must necessarily form diametrically opposite jogs in the plies which give the interlocking effect. Therefore, if the tube spirals at all while being formed, it must spiral as a whole. Since, due to the interlocking of the strips, they cooperate together to resist spiraling, there is twice the tendency to prevent a spiral.

Another advantage of the present method of forming tubing is that tighter seams are formed than in the case where an attempt is made to butt the bevelled edges of the same ply to form the seam. The scarfed or beveled edges of the plies naturally tend to lie compactly along the jogs or offsets, hence there is no appreciable tendency to form voids in the seams near the scarfed edges.

A further advantage is that there are two seams appearing on the exterior of the tube; therefore, it is always easy to tell that these seams are properly spaced apart. Furthermore, the two seams provide two paths for the entrance of copper between the plies.

Still another advantage is that both plies are of the same width. This feature requires that there be only one-half the number of different sizes of stock as would be required for the manufacture of tubing in which the inner layer of tubing is provided entirely by the inner ply and the outer layer of the tube entirely by the outer ply. Naturally, only one-half the number of manipulations are required to set up a scarfing machine for a particular size of tubing.

While the embodiment of the present invention as herein disclosed, constitutes a preferred form, it is to be understood that other forms might be adopted, all coming within the scope of the claims which follow.

What is claimed is as follows:

1. A double-wall tube comprising two plies of strip stock, each of the plies forming a portion of the inner wall of the tube and a portion of the outer wall of the tube, each ply having its outer wall portion completely covering the inner wall portion of the other ply.

2. A double-wall tube comprising two plies of strip stock, each of the plies having a cylindrical portion forming a part of the inner wall of the tube and having a cylindrical portion forming a part of the outer wall of the tube, said portions merging with a jog portion which extends from the inner wall to the outer wall, the edges of one ply closely fitting against the jog portion of the other ply.

3. A double-wall tube comprising two plies of strip stock having beveled edges, each of the plies forming a portion of the inner wall of the tube and a portion of the outer wall of the tube and a jog portion connecting the inner and outer wall portions, the beveled edges of one ply closely fitting against the jog portion of the other ply.

CHARLES A. NICHOLS.
RAYMOND H. BISH.